United States Patent
Oda (10) Patent No.: US 6,340,989 B1
(45) Date of Patent: Jan. 22, 2002

(54) MONITORING METHOD WITH A CCD IMAGING DEVICE AND DIGITAL STILL CAMERA USING THE SAME

(75) Inventor: Kazuya Oda, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/021,859

(22) Filed: Feb. 11, 1998

(30) Foreign Application Priority Data

Feb. 13, 1997 (JP) .............................................. 9-028596

(51) Int. Cl.⁷ .......................... H04N 5/217; H04N 9/64; H04N 5/222
(52) U.S. Cl. ................... 348/246; 348/241; 348/333.11
(58) Field of Search ............................ 348/312, 333.11, 348/241, 246, 247, 220

(56) References Cited

U.S. PATENT DOCUMENTS 4,546,390 A * 10/1985 Konishi et al. ............. 348/220
4,731,665 A * 3/1988 Hashimoto et al. ......... 348/247
4,805,023 A    2/1989 Younse et al.

FOREIGN PATENT DOCUMENTS

EP    0571908 A2    12/1993
EP    0720387 A2    7/1996

* cited by examiner

Primary Examiner—Wendy R. Garber
Assistant Examiner—Rashawn N. Tillery

(57) ABSTRACT

A digital still camera of the present invention allows the user of the camera to monitor a picture being picked up by a CCD (Charge Coupled Device) imaging device provided on the camera. In a monitor mode, a system controller indicates a timing generator one or two or more of a plurality of electrodes forming a vertical transfer path in the imaging device and from which signals should be read out. In response, the timing generator feeds stored charge transfer pulses to the designated electrodes together with vertical drive pulses via a vertical driver. The pixels of the imaging device are reduced, or thinned, in the vertical direction. The resulting reduced picture appears on a liquid crystal monitor via a signal processing section. The user may operate set switches provided on the camera in order to select desired electrodes.

8 Claims, 11 Drawing Sheets

← MOVEMENT OF CHARGE

MONITORING METHOD WITH A CCD IMAGING DEVICE AND DIGITAL STILL CAMERA USING THE SAME

BACKGROUND OF THE INVENTION

1. Field of the Invention

The present invention relates to a monitoring method using a CCD (Charge Coupled Device) imaging device, and a digital still camera using the monitoring method.

2. Description of the Background Art

Advances in the resolution of digital still cameras have recently implemented digital still cameras loaded with CCD imaging devices having 1,000,000 pixels or more. Such advanced digital still cameras include one loaded with an interline type CCD imaging device having 1,300,000 pixels and a mechanical shutter, and one capable of reading 1,300,000 pixels of its CCD imaging device at the same time.

However, an increase in the number of pixels of a CCD imaging device increases a period of time necessary for signals to be read out of the imaging device. For example, in a conventional digital still camera using an interline type CCD imaging device which belongs to a 400,000 pixels (640H×480V) class, only $1/30$ second suffices even when all the pixels are read out at a rate of $1/60$ sec for one field. However, as for a digital still camera with an interline type CCD imaging device belonging to a 1,300,000 pixels (1,280H×1,024V) class, $1/7.5$ second is necessary for all the pixels to be read out at a rate of $1/15$ second for one field.

With a digital still camera, it is a common practice for the user of the camera to monitor the scene being picked up via, e.g., a liquid crystal (LC) monitor. At this instant, slow switching between consecutive pictures would perplex the user. In light of this, a digital still camera with a CCD imaging device having 1,300,000 or more pixels is usually operable either in a shoot mode for reading and recording all the pixels or in a monitor mode for reading only a part of the pixels. The monitor mode allows the user to confirm the angle of view and scene to be shot. In the monitor mode, the pixels of the imaging device from which signals should be read are reduced, or thinned, in the vertical direction so as to promote rapid drawing.

Another problem with the increasing number of pixels of the CCD imaging device is pixel defects including white spots, black spots, and dust. The number of pixel defects naturally increases with the increase in the number of pixels, causing the user to feel unpleasant. To solve this problem, it has been customary to store the addresses of pixel defects in a storage beforehand and to compensate for, in the shoot mode, the pixel defects of a picture written to a memory by interpolating pixels surrounding defective pixels. In the monitor mode, however, a picture read out of the CCD imaging device is directly output to a monitor without any compensation because the above interpolation scheme is time-consuming and because the monitor mode is a mode to confirm the scene to be shot. As a result, a number of defects in the form of spots often appear on the reduced or partial picture due to the pixel defects. Such defects always appear at the same positions on the monitor, obstructing the user's view.

SUMMARY OF THE INVENTION

It is therefore an object of the present invention to provide a monitoring method with a CCD imaging device and capable of drawing on a monitor a picture with a minimum of influence of pixel defects in a monitor mode which effects vertical reduction or thinning, and a digital still camera using the monitoring method.

In accordance with the present invention, a monitoring method using a CCD imaging device having a multiphase electrode structure having a plurality of electrodes from which photoelectrically converted charges are output in response to stored charge transfer pulses has the steps of selecting one or two or more of the electrodes capable of minimizing the number of pixel defects in a picture to be monitored while being reduced in the vertical direction, and applying the stored charge transfer pulses only to the one or the two or more electrodes selected to thereby output a vertically thinned picture.

Also, in accordance with the present invention, a monitoring method using a CCD imaging device having a multiphase electrode structure having a plurality of electrodes from which photoelectrically converted charges are output in response to stored charge transfer pulses has the steps of switching one or two or more of the electrodes to thereby produce a plurality of pictures, allocating, based on the addresses of pixel defects present on the imaging device, the pixel defects to the plurality of pictures, totalizing the pixel defects picture by picture to thereby determine one picture including the smallest number of pixel defects, and applying the stored charge transfer pulses to one or two or more of the electrodes capable of producing the one picture to thereby output a vertically thinned picture to be monitored.

Further, in accordance with the present invention, a digital still camera includes a CCD imaging device having a multiphase electrode structure having a plurality of electrodes from which photoelectrically converted charges are output in response to stored charge transfer pulses. A selecting section selects one or two or more of the electrodes to which the stored charge transfer pulses should be applied in a monitor mode.

Moreover, in accordance with the present invention, a digital still camera includes a CCD imaging device having a multiphase electrode structure having a plurality of electrodes from which photoelectrically converted charges are output in response to stored charge transfer pulses. A storage stores pixel defects present on the imaging device in the form of addresses of the imaging device beforehand. A setting section switches one or two or more of the electrodes to thereby produce a plurality of pictures, allocates the pixel defects to the plurality of pictures on the basis of the addresses of pixel defects, totalizes the pixel defects picture by picture to thereby determine one picture including the smallest number of pixel defects, and applies the stored charge transfer pulses to one or two or more of the electrodes capable of producing the one picture to thereby output a vertically thinned picture to be monitored.

In addition, in accordance with the present invention, a digital still camera includes a CCD imaging device having a multiphase electrode structure having a plurality of electrodes from which photoelectrically converted charges are output in response to stored charge transfer pulses. A storage stores pixel defects present on the imaging device in the form of addresses of the imaging device beforehand. A setting section switches one or two or more of the electrodes to thereby produce a plurality of pictures, allocates the pixel defects to the plurality of pictures on the basis of the addresses of the pixel defects, totalizes the pixel defects picture by picture to thereby determine one picture including the smallest number of pixel defects, and applies the stored charge transfer pulses to one or two or more of the plurality electrodes capable of producing the one picture to thereby output a vertically thinned picture to be monitored. A controller causes, when the addresses stored in the storage are updated, the setting section to set the electrodes to which the stored charge transfer pulses should be applied at the time of monitoring.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Figure 1:
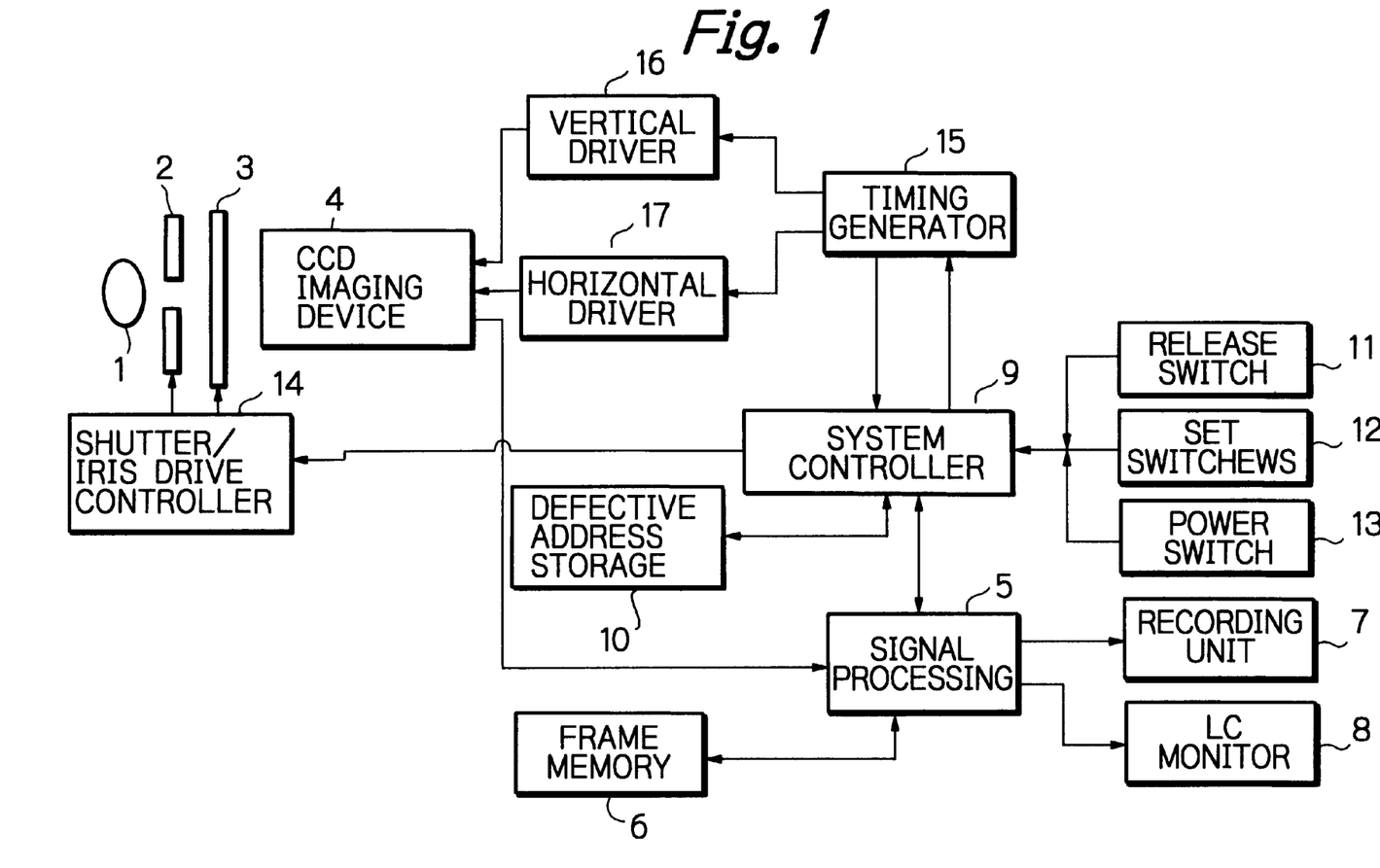
FIG. 1 is a block diagram schematically showing a digital still camera embodying the present invention.

Referring to FIG. 1 of the drawings, a digital still camera embodying the present invention is shown. The embodiment to be described is capable of selecting, in a monitor mode, lines to be omitted in the vertical direction so as to draw a picture with few pixel defects on a monitor.

As shown in FIG. 1, the digital still camera includes a CCD imaging device 4 implemented by an interline type CCD image sensor having photodiodes arranged in a two-dimensional plane. An optical image is incident to the imaging device 4 via a lens 1, an iris 2, and a shutter 3. The imaging device 4 transforms the optical image to a corresponding analog electric signal and delivers the electric signal to a signal processing 5. For the photoelectric transduction, a vertical driver 16 and a horizontal driver 17 each feeds respective drive pulses to the imaging device 4. A frame memory 6 for storing the signal output from the signal processing 5, a recording unit 7, an LC monitor 8 and a system controller 9 are connected to the signal processing 5.

In a shoot mode, as distinguished from a monitor mode, the system controller 9 causes the signal processing 5 to execute preselected preprocessing with the analog signal received from the imaging device 4, convert the analog signal to a digital signal, and store the digital signal temporarily in the frame memory 6. Then, the signal processing 5 executes interpolation and other conventional processing with the signal stored in the frame memory 6, and delivers the processed signal to the recording unit 7. In the monitor mode, the system controller 9 causes the signal processing 5 to transform the signal read out of the imaging device 4 to, e.g., a video signal and deliver the video signal to the LC monitor 8. The recording unit 7 records the signal processed by the signal processing 5 in a memory card, floppy disk or similar recording medium. The signal output from the imaging device 4 in the monitor mode and appearing on the LC monitor allows the user of the camera to confirm the angle of view and the scene being picked up.

A defective address storage 10, a release switch 11, set switches 12, a power switch 13, a shutter/iris drive controller 14 and a timing generator 15 are connected to the system controller 9. The defective address storage 10 stores the addresses of pixel defects of the imaging device 4. The release switch 11 is an auxiliary implementation for releasing the shutter 3 held in its set position. The set switches 12 are selectively operated by the user in order to set desired shooting conditions. The shutter/iris drive controller 14 drives the iris 2 and shutter 3 in response to commands received from the system controller 9.

The system controller 9 generates, based on shooting conditions selected on the release switch 11 and set switches 12, control information necessary for system control. The control information are representative of a drive mode (shoot mode, monitor mode or the like), an electronic shutter speed, a lens opening, electrodes from which signals should be read out in the monitor mode, and so forth. Such control information are fed from the system controller 9 to the signal processing 5, shutter/iris drive controller 14, and timing generator 15. The system controller 9 additionally has a function of determining, based on data stored in the defective address storage 10, electrodes from which signals should be read out in the monitor mode.

The timing generator 15 generates drive pulses for driving the imaging device 4 in accordance with the control information received from the system controller 9. The drive pulses are fed from the timing generator 15 to the vertical driver 16 and horizontal driver 17. Further, the timing generator 15 generates synchronizing pulses necessary for system control and signal processing and delivers them to the signal processing 5 and system controller 9. The vertical driver 16 and horizontal driver 17 transfers the drive pulses received from the timing generator 15 to the imaging device 4.

The embodiment shown in FIG. 1 includes the shutter 3 because the imaging device 4 is implemented by an interline type CCD image sensor. The mechanical shutter will be needless if the imaging device 4 is implemented by, e.g., a CCD image sensor allowing all of its pixels read out at the same time.

The imaging device 4 will be described specifically with reference to FIG. 2. As shown, the imaging device 4 is an interline type CCD image sensor having an eight-phase electrode structure. A number of photodiodes 21 are arranged vertically and horizontally in a two-dimensional plane. The photodiodes 21 each is connected to a vertical transfer path 22 by a respective read gate 23. Each vertical transfer path 22 has its bottom connected to a single horizontal transfer path 24 which is connected to an output amplifier 25 at its left end, as viewed in FIG. 2. Vertical drive pulses $\phi_{V1}$–$\phi_{V8}$ are applied to the vertical transfer paths 22 while horizontal drive pulses $\phi_{H1}$ and $\phi_{H2}$ are applied to the horizontal transfer path 24.

Two different methods are available for reading signals out of the imaging device 4., i.e., one which reads signals out of all the pixels constituting a frame or one which reads signals out of a part of the pixels, e.g., one-fourth of the pixels by vertical reduction or thinning. Generally, the full pixel reading method and one-fourth pixel reading method are respectively assigned to the shoot mode and monitor mode, as stated earlier.

Figure 4:
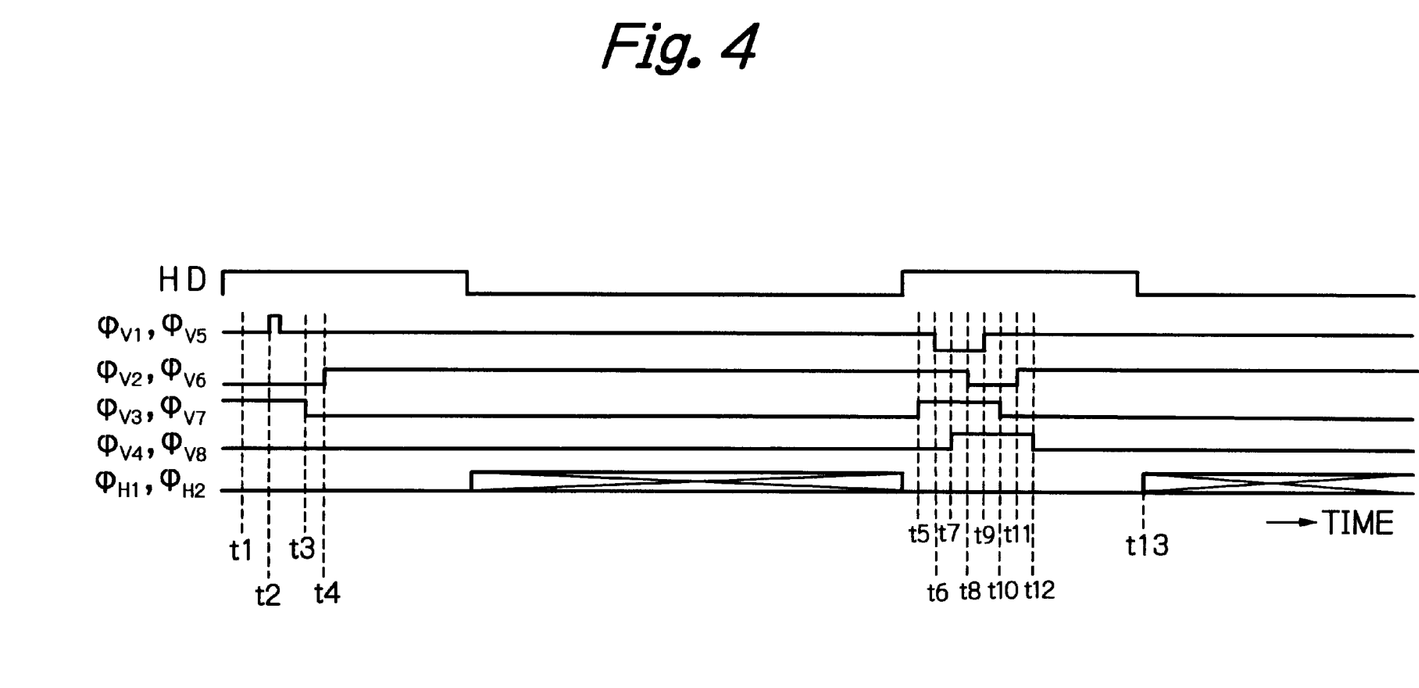
FIG. 4 shows a part of the timing chart of FIG. 2 in an enlarged scale.
Figure 5:
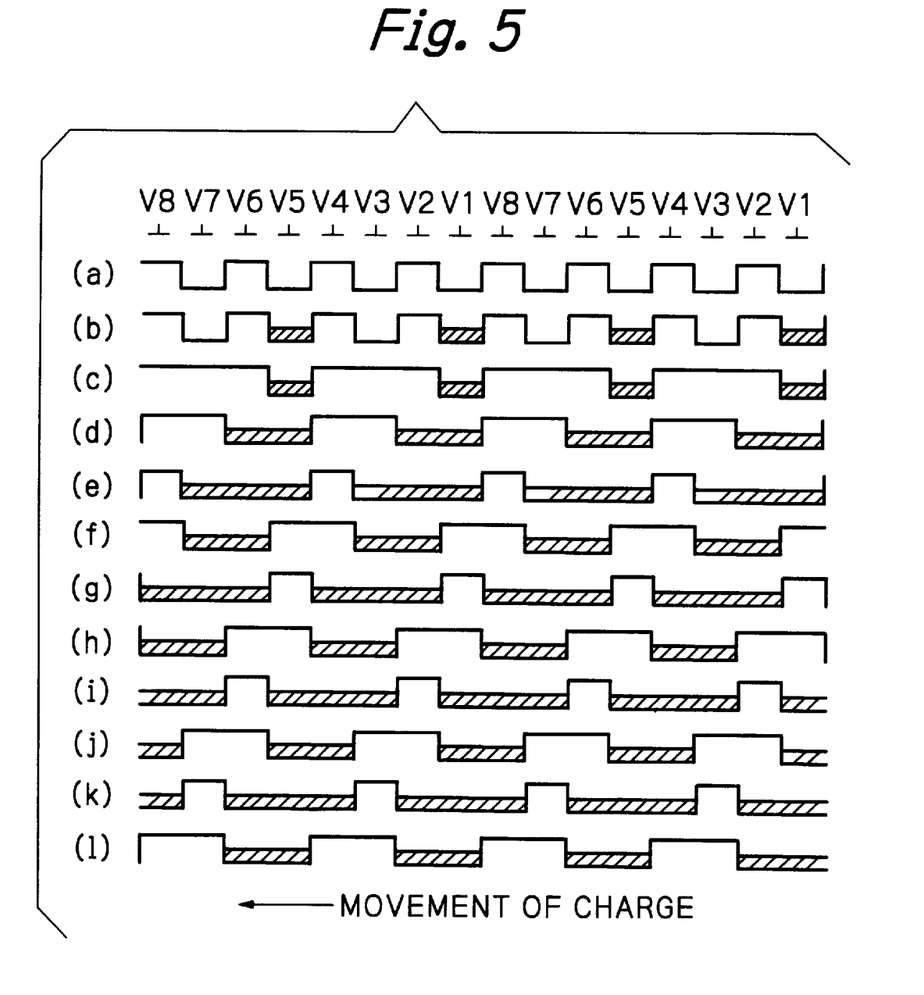
FIG. 5 shows potentials on a vertical transfer path to appear in the full pixel reading condition.

First, how all the pixels of the imaging device 4 are read will be described with reference to FIGS. 3–5. FIGS. 3 and 4 are timing charts demonstrating the operation of the imaging device 4. There are shown in FIGS. 3 and 4 a vertical synchronizing signal VD, a horizontal synchronizing signal HD, and the previously mentioned vertical drive pulses $\phi_{V1}$–$\phi_{V8}$ and horizontal drive pulses $\phi_{H1}$ and $\phi_{H2}$. The drive pulses $\phi_{V1}$–$\phi_{V8}$ are respectively applied to electrodes V1–V8 arranged on each vertical transfer paths 22. FIG. 4 shows a portion A of FIG. 3 in an enlarged scale. FIG. 5 shows potentials and the movement charges on the electrodes V1–V8 of one of the vertical transfer paths 22; (a)–(l) are representative of the potentials and charges of the electrodes V1–V8 at times t1–t12, respectively, shown in FIG. 4.

Figure 2:
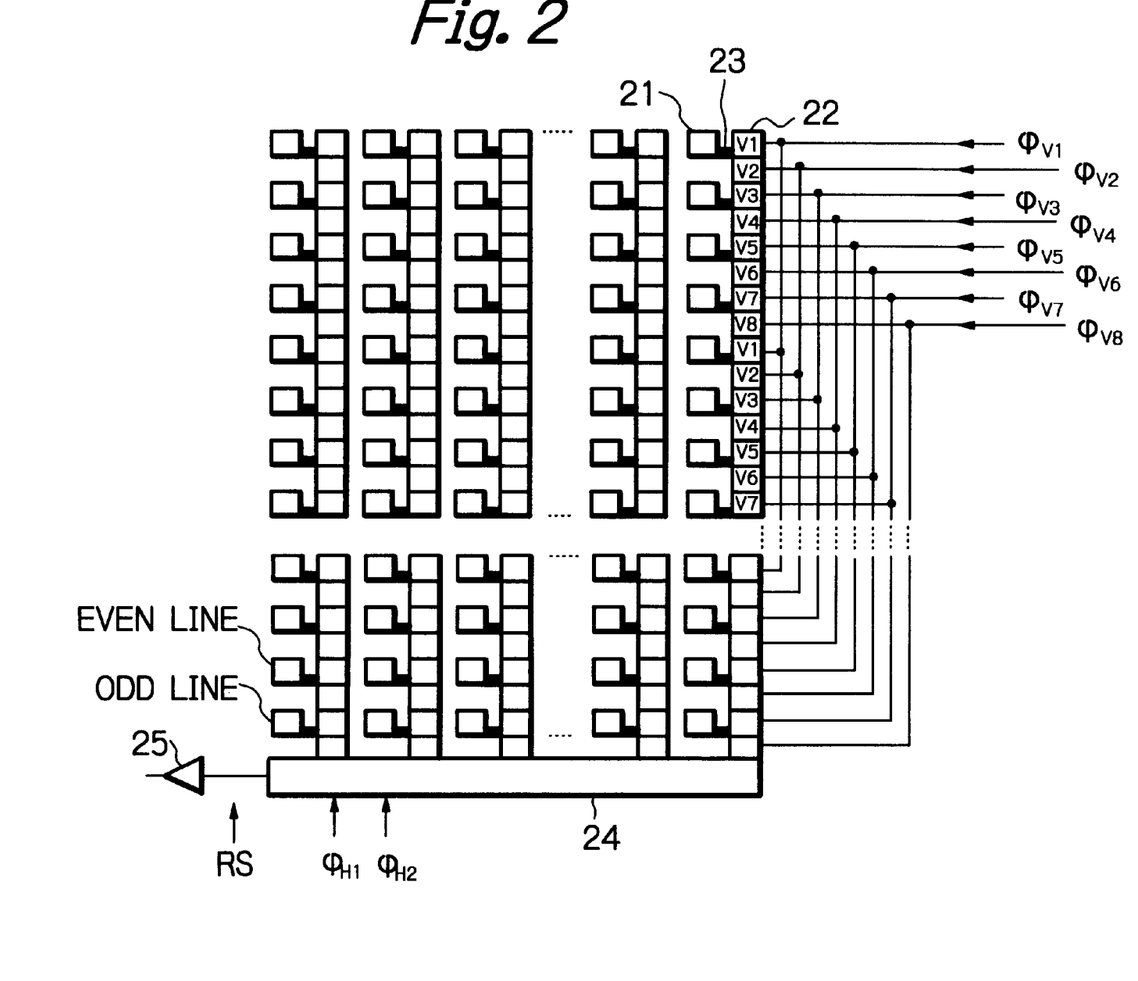
FIG. 2 shows a specific configuration of a CCD imaging device included in the embodiment and implemented as an interline type CCD image sensor having an eight-phase electrode structure.
Figure 3:
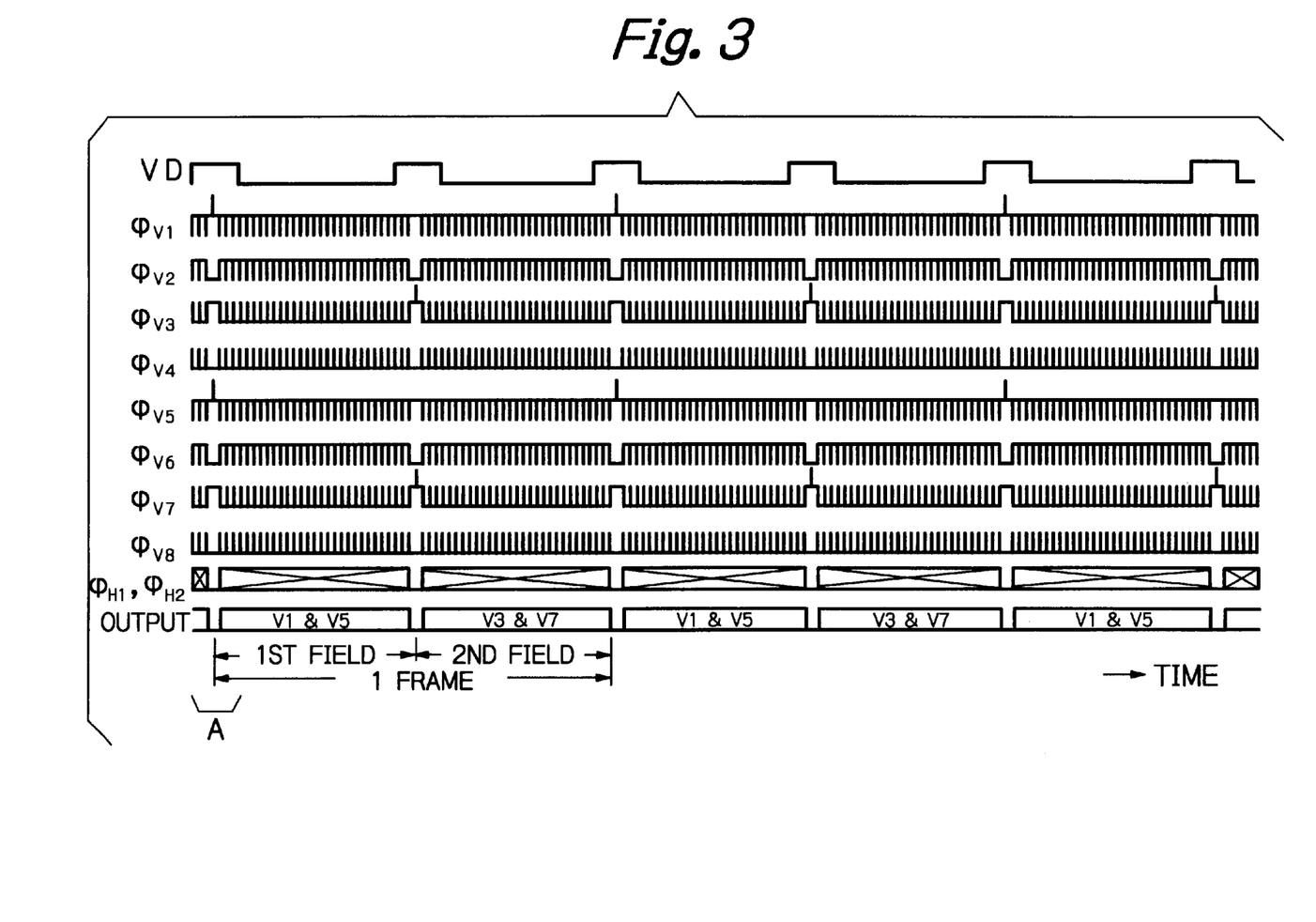
FIG. 3 is a timing chart demonstrating the operation of the imaging device of FIG. 2 for reading all pixels constituting a frame at the same time in a full pixel reading condition.

As shown in FIG. 3, at the beginning of the first field, stored charge transfer pulses for turning on the read gates 23, FIG. 2, are applied to the electrodes V1 and V5 of each vertical transfer path 22 while being superposed on the vertical drive pulses $\phi_{V1}$ and $\phi_{V5}$. At the beginning of the second field, the stored charge transfer pulses are applied to the electrodes V3 and V7 of the vertical transfer path 22 while being superposed on the vertical drive pulses $\phi_{V3}$ and $\phi_{V7}$. The read gates 23 turned on by the above transfer pulses allow signal charges output from the associated photodiodes 21 by photoelectric transduction to move to the vertical transport path 22.

Subsequently, the vertical drive pulses $\phi_{V1}$–$\phi_{V8}$ are repeatedly applied to the electrodes V1–V8, respectively, in order to sequentially transfer the signal charges from the consecutive vertical transfer paths 22 to the horizontal transfer path 24. Every time the signal charges are input from each vertical transfer path 22 to the horizontal transfer path 24, the horizontal drive pulses $\phi_{H1}$ and $\phi_{H2}$ are repeatedly applied to the horizontal transfer path 24. As a result, the signal charges are sequentially transferred from the horizontal transfer paths 24 to the output amplifier 25. The output amplifier 25 transforms the signal charges to E. corresponding electric signals.

For example, assume that the vertical drive pulses $\phi_{V1}$–$\phi_{V8}$ having waveforms shown in FIG. 4 are respectively applied to the electrodes V1–V8 in the first field. Then, potentials on the electrodes V1–V8 sequentially vary from the time t1 to the time t12, as shown in (a)–(l) of FIG. 5. The signal charges moved from the photodiodes 21 to the electrodes V1 and V5 at the time t2 in response to the stored charge transfer pulses are sequentially transferred to the associated horizontal transfer path 24. The signal charges reached the horizontal transfer path 24 at the time t12 are transferred to the output amplifier 25 by the horizontal drive pulses $\phi_{H1}$ and $\phi_{H2}$ repeatedly applied to the path 24 from a time t13. It is to be noted that at the time t4 the signal charge from the electrode V5 has not reached the horizontal transfer path 24 yet, and therefore the output amplifier 25 produces no signals in spite of the repeated application of the drive pulses $\phi_{H1}$ and $\phi_{H2}$ to the path 24.

As stated above, to read all the pixels constituting a frame, the output amplifier 25 produces the signals transferred from the electrodes V1 and V5 in the first frame, and then produces the signals transferred from the electrodes V3 and V7 in the second field. Consequently, all the signals (pixels) are read out in a single frame period.

Figure 6:
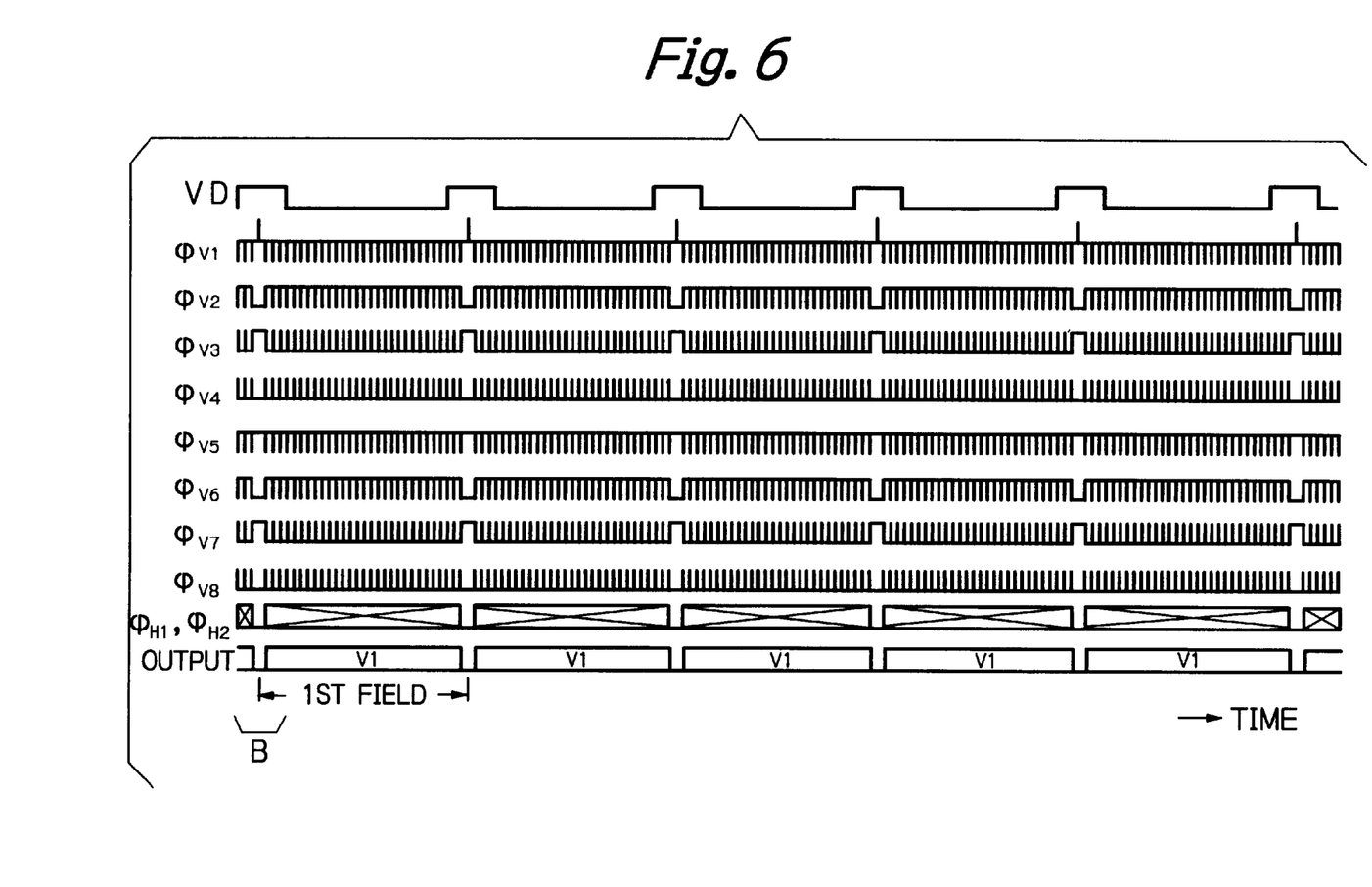
FIG. 6 is a timing chart showing the operation of the image sensor of FIG. 2 for reading only one-fourth of all the pixels in the vertical direction in a partial pixel reading condition.
Figure 7:
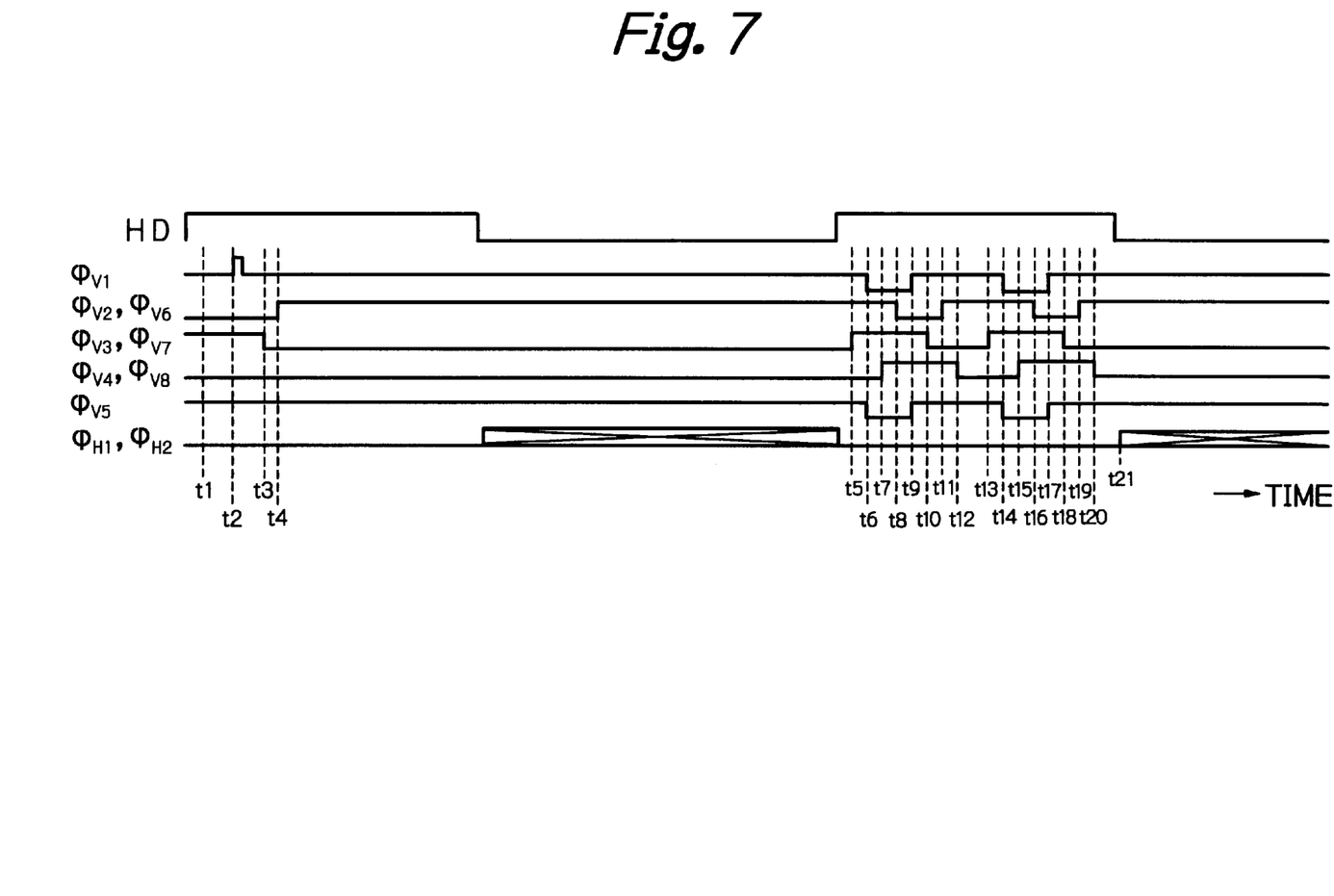
FIG. 7 shows a part of the timing chart of FIG. 6 in an enlarged scale.
Figure 8:
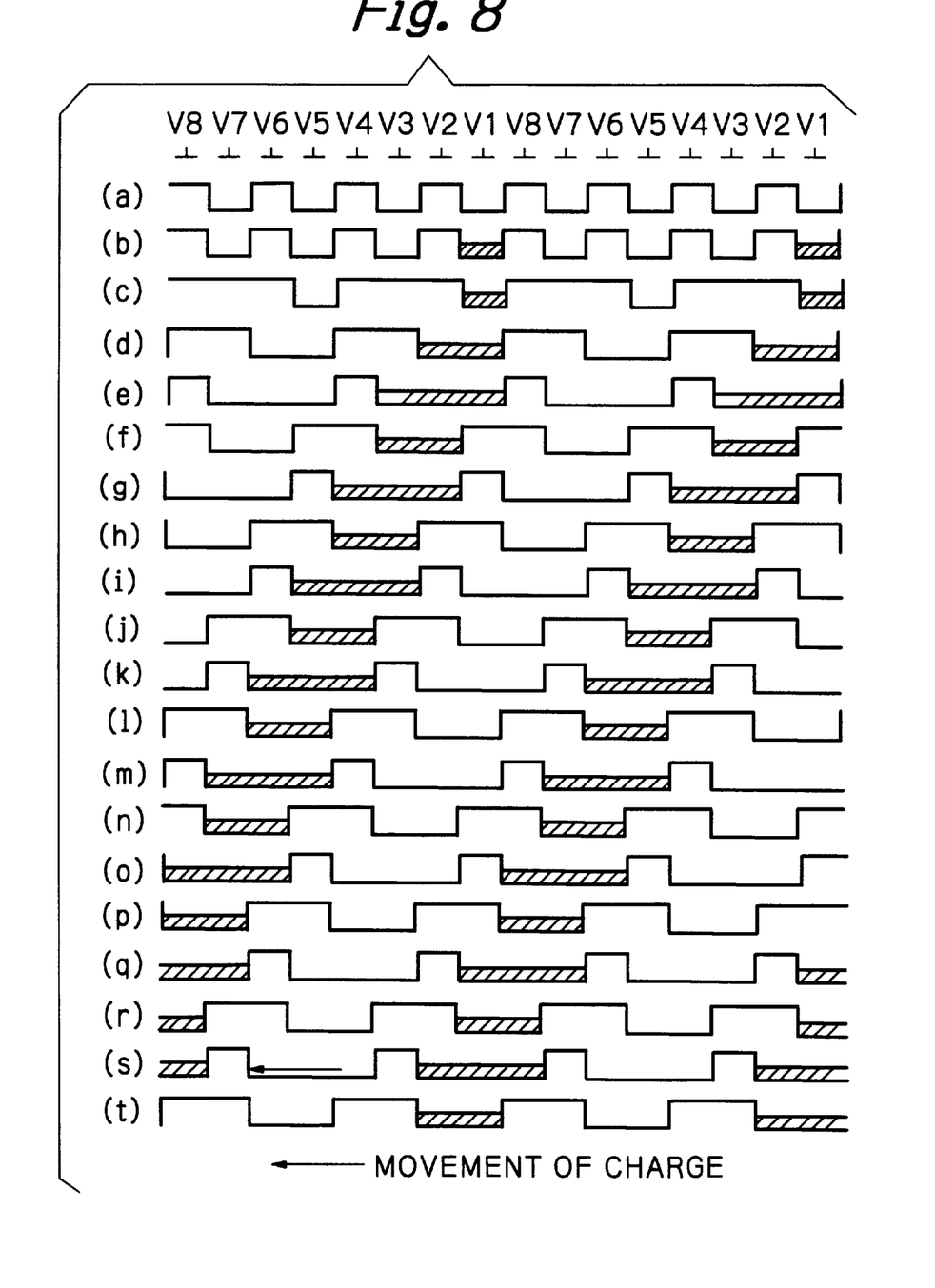
FIG. 8 shows potentials on the vertical transfer path to appear in the one-fourth pixel reading condition.

Reference will be made to FIGS. 6–8 for describing the operation of the imaging device 4 by the one-fourth pixel reading scheme mentioned earlier. FIG. 6 is a timing chart demonstrating the operation of the imaging device 4. FIG. 7 shows a portion B of FIG. 6 in an enlarged scale. FIG. 8 shows potentials on the individual vertical transfer path 22. In FIGS. 6–8, the same components as the components shown in FIGS. 3–5 are designated by identical references.

As shown in FIG. 6, at the beginning of each of the first and second fields, the stored charge transfer pulses for turning on the read gates 23 are applied only to the electrodes V1 of the vertical transfer paths 22 while being superposed on the vertical drive pulses $\phi_{V1}$. The read gates 23 turned on by the above transfer pulses transfer signal charges output from the associated photodiodes to the electrodes V1 of the vertical transfer paths 22. Subsequently, the vertical drive pulses $\phi_{V1}$–$\phi_{V8}$ and horizontal drive pulses $\phi_{H1}$ and $\phi_{H2}$ are repeatedly applied to the electrodes V1–V8 and horizontal transfer path 24, respectively, as in the full pixel reading scheme. Consequently, the signal charges are sequentially transferred to the output amplifier 25 and transformed to electric signals thereby.

For example, assume that in the first field the vertical drive pulses $\phi V1$–$\phi V8$ having waveforms shown in FIG. 7 are respectively applied to the electrodes V1–V8 of the vertical transfer path 22. Then, potentials on the electrodes V1–V8 sequentially vary at times t1–t20, as shown in FIG. 8, (a)–(t). Therefore, the signal charge moved from the photodiode 21 to the electrode V1 by the stored charge transfer pulse is sequentially transferred toward the horizontal transfer path 24. The signal pulses transferred from the vertical transfer paths 22 to the horizontal transfer path 24 are transferred to the output amplifier 25 by the horizontal drive pulses $\phi_{H1}$ and $\phi_{H2}$ repeatedly applied from a time t21, and output from the amplifier 25 in the form of electric signals.

As stated above, in the one-fourth pixel reading scheme using vertical reduction, signals transferred from the electrodes V1 field by field are output from the output amplifier 25, but no signals are transferred to the amplifier 25 from the other electrodes V3, V5 and V7. As a result, only one-fourth of the pixels are read out. Of course, signals may be read out of any one of the electrodes V3, V5 and V7 other than the electrode V1. Assume an interline type CCD image sensor having a four-electrode structure, i.e., the image sensor of FIG. 2 from which the electrodes V5–V8 are omitted. With this kind of image sensor, it is possible to read signals out of one-half of its pixels, i.e., either one of odd lines and even lines.

A decrease in reading time achievable with the one-fourth pixel reading scheme is as follows. Assume that signals are read out of a CCD image sensor whose number of valid pixels belongs to a 1,280H×1,024V class. Then, the number of pixels in the horizontal direction is generally the sum of 1,280 valid pixels, fifty OB pixels, and thirty dummy pixels, i.e., 1,360 pixels in total while the horizontal blanking period for applying vertical drive pulses corresponds to about 400 clocks (KLC). Therefore, assuming that the image sensor is driven at a frequency of 14.3 MHz, then a period of time necessary for the horizontal reading is 1HD=1,760 KLC÷14.3 MHz=123 μsec. On the other hand, the number of lines in the vertical direction is generally the sum of 512 valid lines, ten OB lines and three dummy lines, i.e., 525 lines in total. Because idle transfer and the vertical blanking period for applying horizontal drive pulses need about 10H, a period of time necessary for the vertical reading is 1VD= 533 HD=65.8 msec=1/15 sec.

As for the full pixel reading scheme implemented by frame drive, the reading time is 2VD=1/7.5 sec. By contrast, the reading time is 1/15 sec for the one-half pixel reading scheme using vertical reduction or 1/30 sec for the one-fourth pixel reading scheme also using vertical reduction; such a reading time is far shorter than the reading time necessary for the full pixel reading scheme. For this reason, it has been customary with a high pixel CCD imaging device to read its pixels by the vertical thinning scheme in order to reduce the time in the monitor mode.

Usually, as the number of pixels of a CCD imaging device increases, pixel defects also increase in number and appear on a monitor even when the pixels are thinned in the vertical direction, as stated earlier. In light of this, the illustrative embodiment selects, in the monitor mode, particular lines to be omitted in the vertical direction and thereby draws an image with few pixel defects on a monitor.

Figure 9A:
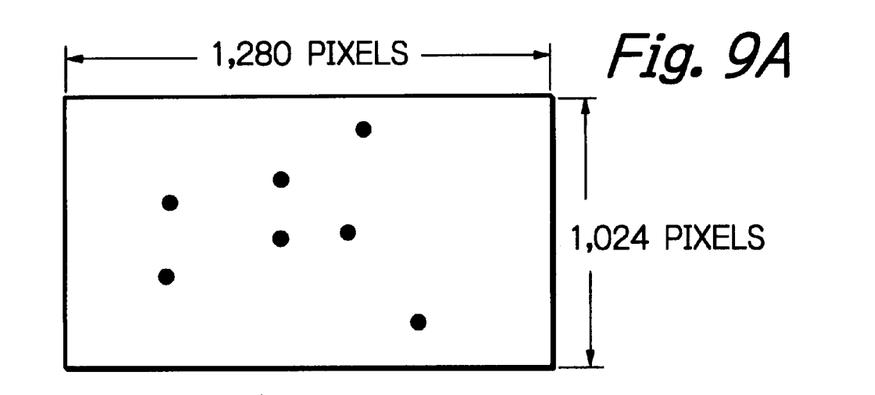
FIGS. 9A–9E each shows a particular monitoring method available with the imaging device shown in FIG. 2.

FIGS. 9A–9E demonstrate a monitoring method available with the imaging device 4, FIG. 1, implemented by a CCD image sensor having an eight-phase electrode structure. FIG. 9A shows a specific picture appearing on a monitor in the full pixel reading condition and consisting of 1,280H×1, 024V pixels. FIGS. 9B–9E each shows a particular picture appearing on the monitor in the one-fourth pixel reading condition and consisting of 1,280H×256V pixels. Specifically, the pictures shown in FIGS. 9B–9E respectively appear when only signals output from the photodiodes 21 connected to the electrodes V1, V3, V5 and V7 are read out. Dots on each picture show specific pixel defects in an exaggerated form.

Figures 9B, 9C, 9D, 9E:
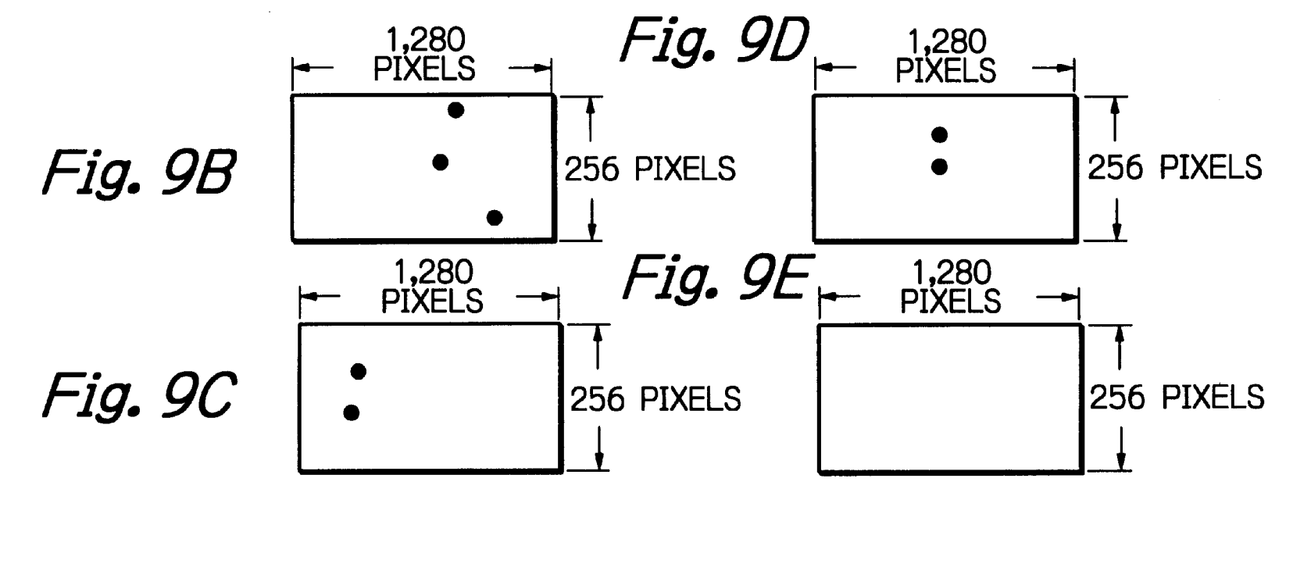

Assume that seven pixel defects are present in the imaging device 4 at positions shown in FIG. 9A. Then, how the pixel defects appear on the monitor screen depends on the electrodes from which signals are read out in the vertical thinning condition, as follows. When the electrodes V1 are selected, three pixel defects appear on the screen, as shown in FIG. 9B. When the electrodes V3 are selected, two pixel defects appear on the left portion of the screen, as shown in FIG. 9C. When the electrodes V5 are selected, two pixel defects appear at substantially the center of the screen, as shown in FIG. 9D. By contrast, when the electrodes V7 are selected, none of the pixel defects appears on the screen, as shown in FIG. 9E. Therefore, in the monitor mode, a picture free from the pixel defects will appear on the screen if the electrodes V7 are selected and if the stored charge transfer pulses are applied only to the electrodes V7.

It will be seen from the above that a picture with few pixel defects is achievable in the monitor mode if particular electrodes matching with the positions of pixel defects of the imaging device 4 are selected in the event of thinning. In the illustrative embodiment, the set switches 12 shown in FIG. 1 include switches for allowing the user of the camera to select any one of the electrodes V1, V3, V5 and V7. It follows that the user can operate the set switches 12 in the monitor mode in order to designate the electrodes from which signals should be read out, thereby monitoring a desired vertically thinned picture.

Specifically, the user of the camera can select particular electrodes, i.e., a desirable picture with few pixel defects by sequentially operating the set switches 12 while watching the LC monitor 8. Alternatively, if address data representative of the positions of the pixel defects on the imaging device 4 are available, the desirable picture can be automatically selected on the basis of the address data, as follows. For the automatic selection of the desirable picture, it is necessary to see the addresses of the pixel defects. A specific procedure for searching for the addresses of pixel defects in a digital still camera will be described with reference to FIG. 10.

Pixel defects particular to a CCD image sensor are generally classified into white spots, black spots, and dust, and the searching method depends on the kind of pixel defects. The procedure shown in FIG. 10 begins with a step S1 for determining the kind of spots to be searched. To search for white spots, the iris or the shutter of the camera is closed in order to shield light (step S2). Then, an exposing time (charge storing time) long enough for a sufficient dark current to be achievable with the individual photodiode of the image sensor, e.g., several seconds is set (step S3).

Figure 10:
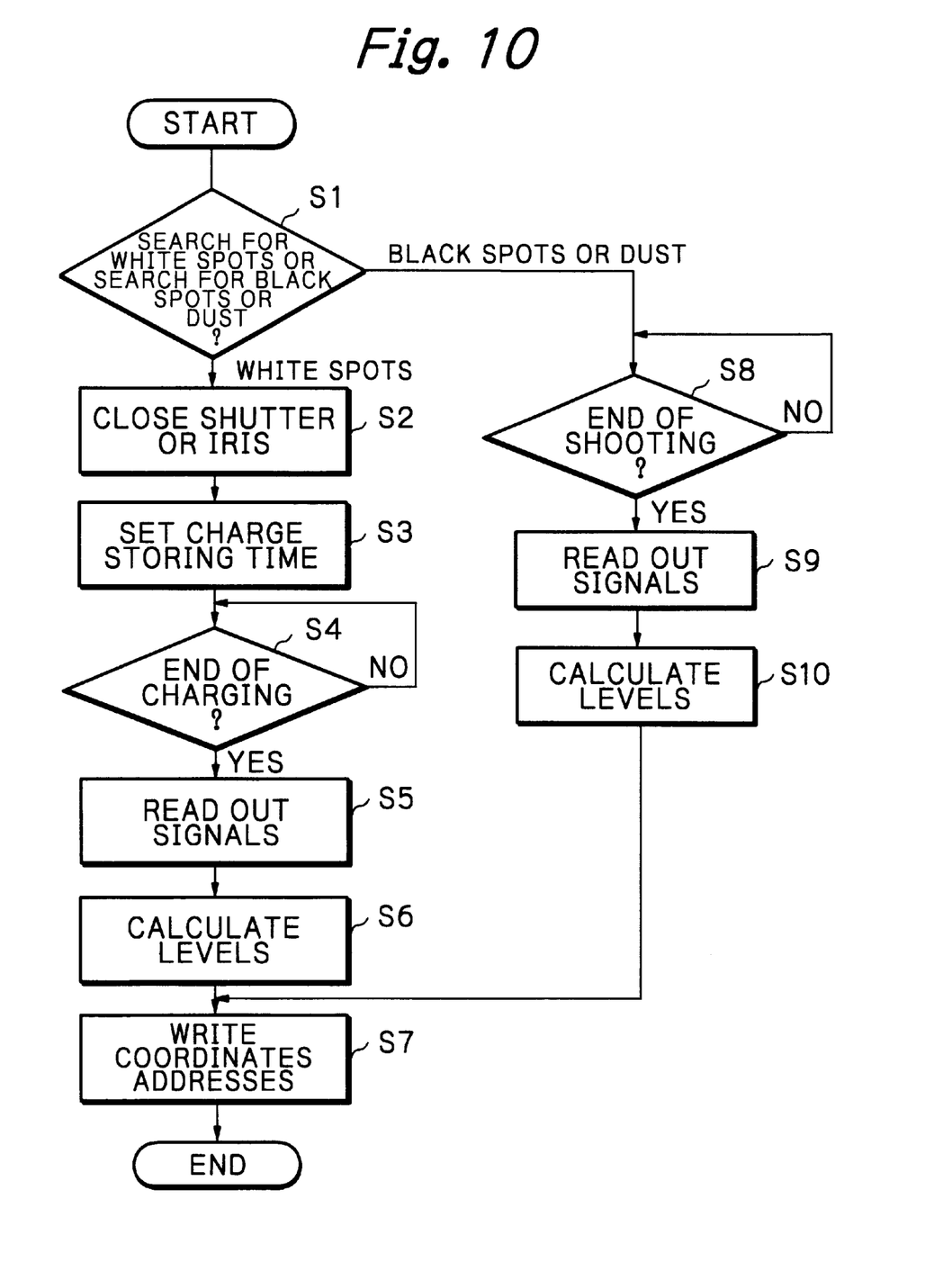
FIG. 10 is a flowchart showing a procedure to be executed by the embodiment for searching for the addresses of pixel defects of the imaging device.

Subsequently, whether or not the charge storing time has expired, i.e., whether or not a charge has been stored in the individual photodiode is determined (step S4). If the answer of the step S4 is positive (YES), the charges of all the photodiodes are read out in the form of electric signals (step S5). The electric signals have their levels compared with a preselected reference level one by one (step S6). If the level of any one of the electric signals is higher than the reference level, it is determined that a white spot is present at the pixel corresponding to the electric signal. The address of the white spot on the image sensor is written to a preselected storage (step S7). If the answer of the step S4 is negative (NO), the step S4 is repeated.

On the other hand, to search for black spots or dust, the camera is operated to shoot a subject while illuminating it uniformly such that a quantity of light which is, e.g., about 50% of the saturation level is uniformly incident to the image sensor. Then, whether or not the shooting operation has ended is determined (step S8). If the answer of the step S8 is YES, drive pulses are applied to the image sensor in order to read out the charges of the photodiodes in the form of electric signals (step S9). The electric signals have their levels compared with a preselected reference level assigned to black (step S10).

If any one of the electric signals is higher than the reference level, it is determined that a black spot or dust is present at the pixel corresponding to the electric signal. The address of the black spot or dust on the image sensor is also written to the previously mentioned storage (step S7). By such a procedure, the address of all the pixel defects on the image sensor are attained. Of course, if the address data of image defects particular to a CCD image sensor are available at the time of delivery of the image sensor, the above procedure is not necessary. In the camera shown in FIG. 1, the storage 10 plays the role of the above storage to which the address data of pixel defects are written.

Figure 11:
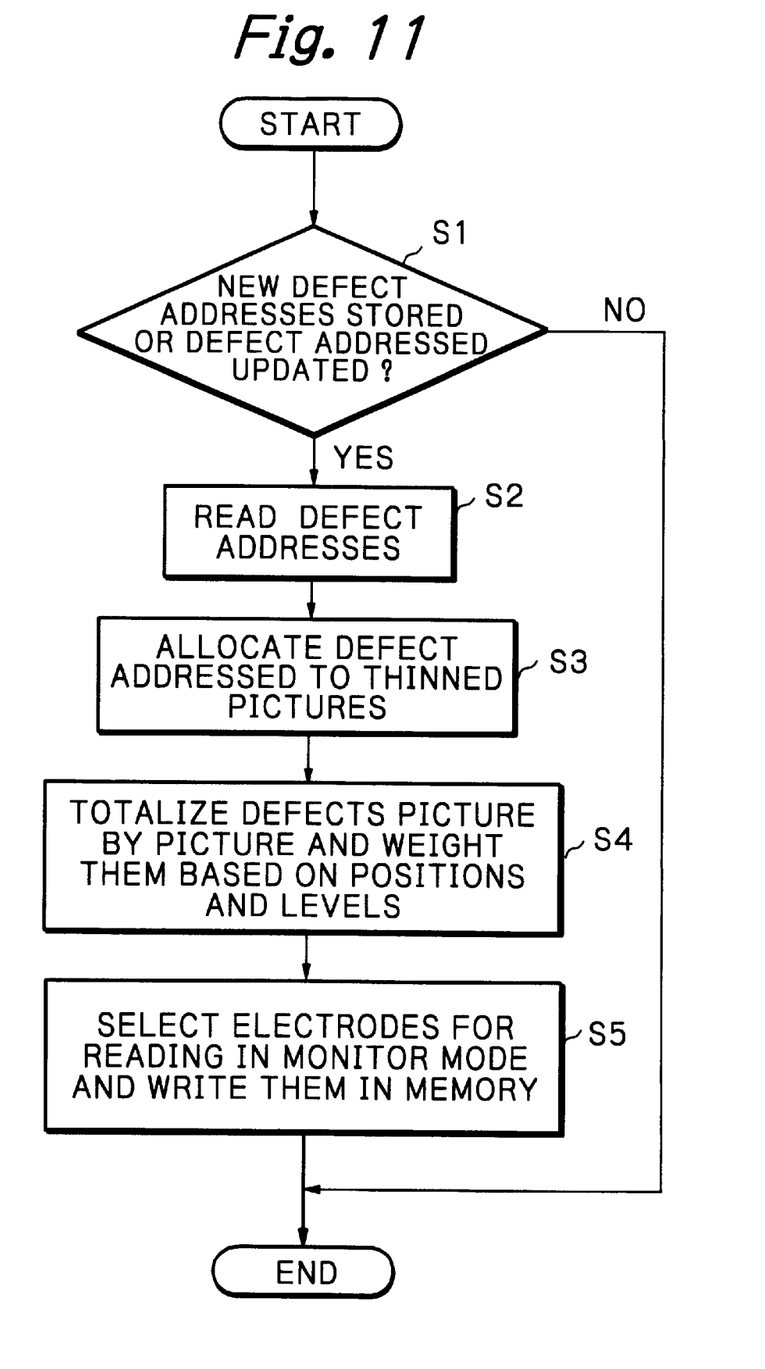
FIG. 11 is a flowchart showing a procedure to be also executed by the embodiment for selecting electrodes to which stored charge transfer pulses should be applied in a monitor mode.

Reference will be made to FIG. 11 for describing a specific routine in which the camera shown in FIG. 1, particularly the system controller 9, selects the electrodes from which signals should be read out in the monitor mode. As shown, on receiving an electrode select command from the set switches 12, the system controller determines whether or not the address data of pixel defects have been newly written to the defective address storage 10 or whether or not they have been updated (step S1). If the answer of the step S1 is NO, the routine simply ends because the selection of electrodes is not necessary. Usually, the storage of new address data of pixel defects is effected on a production line. If the answer of the step S1 is YES, the system controller 9 reads the address of pixel defects out of the storage 10 (step S2).

Subsequently, the system controller 9 allocates, based on the addresses, the above pixel defects to a plurality of pictures produced by sequentially switching the electrodes while effecting the vertical thinning (step S3). For example, assume the full pixel picture of FIG. 9A produced by reading all the pixels and the one fourth pixel pictures of FIGS. 9B–9E produced by sequentially switching the electrodes. Then, the pixel defects are individually allocated to the four different pictures of FIGS. 9B–9E to which they belong on the basis of their addresses. After the step S3, the system controller 9 totalizes the allocated pixel defects picture by picture (step S4).

The unpleasantness which the pixel defects give the user depends on the positions, levels and other factors of the pixel defects to appear on the vertically thinned picture. Considering this, the system controller 9 may advantageously weight the pixel defects in accordance with the above factors before the picture-by-picture totalization. The system controller 9 compares the number of pixel defects totalized picture by picture. Then, the system controller 9 selects the electrodes corresponding to one picture having the smallest number of pixel defects as electrodes from which signals should be read out in the monitor mode (step S5). The system controller 9 writes the name of the electrodes selected in a memory built therein. In the monitor mode, the system controller 9 reads the name of the electrodes out of its memory and commands the timing generator 15 to apply the stored charge transfer pulses to the electrodes designated by the above name.

As stated above, the address data of pixel defects are stored in the storage 10 and allow the electrodes from which signals should be read out by the stored charge transfer pulses in the monitor mode to be automatically selected. Of course, the user of the camera may operate the set switches 12 in order to indicate the system controller desired electrodes from which signals should be read out in the monitor mode, as stated earlier. In such a case, the system controller 9 will write the name of the desired electrodes in its memory, read out the name in the monitor mode, and cause the timing generator 15 to apply the stored charge transfer pulses to the desired electrodes.

The timing generator 15 generates the stored charge transfer pulses to be applied to the electrodes designated by the system controller 9. These pulses are fed from the timing generator 15 to the imaging device 4 together with the vertical drive pulses $\phi_{V1}$–$\phi_{V8}$ via the vertical driver 16. The pulses are applied to the designated electrodes of the vertical transfer paths 22. As a result, vertically thinned signals are output from the imaging device 4 and fed to the LC monitor 8 via the signal processing 5, displaying a picture on the monitor 8. The user watching the monitor 8 may again operate the set switches 12 in order to again switch the electrodes from which signals should be read out.

While the above illustrative embodiment has concentrated on a digital still camera, the present invention is similarly applicable to any other kind of image pick-up device capable of selecting electrodes for reading signals out of a CCD image sensor while thinning them in the vertical direction.

In summary, in accordance with the present invention, among a plurality of electrodes of a CCD imaging device from which signals can be read out in response to stored charge transfer pulses, one electrode or two or more electrodes to which the above pulses should be applied in a monitor mode for vertical thinning can be selected, as desired. This allows particular electrodes to be selected in accordance with the pixel defects of the imaging device and thereby produces a monitor picture having few pixel defects.

Further, the pixel defects of the imaging device are allocated, based on their addresses, to a plurality of different pictures produced by sequentially switching one or two or more electrodes to which the transfer pulses should be applied. Then, the pixel defects are totalized picture by picture so as to determine one picture in which the number of defects is smallest. The electrodes corresponding to the picture having the smallest number of pixel defects are selected as electrodes to which the transfer pulse should be applied in the monitor mode. It follows that a monitor picture with few pixel defects is readily achievable even when the addresses of the pixel defects are updated.

The entire disclosure of Japanese patent application No. 28596/1997 filed on Feb. 13, 1997 including the specification, claims, accompanying drawings and abstract of the disclosure is incorporated herein by reference in its entirety.

While the present invention has been described with reference to the illustrative embodiment, it is not to be restricted by the embodiment. It is to be appreciated that those skilled in the art can change or modify the embodiment without departing from the scope and spirit of the present invention.

What is claimed is:

1. A monitoring method using a CCD imaging device having a multiphase electrode structure having a plurality of electrodes from which photoelectrically converted charges are output in response to stored charge transfer pulses, said monitoring method comprising the steps of:

switching one or two or more of the plurality of electrodes by a set switch, to thereby output a plurality of vertically thinned pictures which differ from each other in number of omitted lines; and setting said set switch to select the one or the two or more electrodes capable of producing one picture including a relatively smallest number of pixel defects among the plurality of vertically thinned pictures in a monitor mode.

2. A monitoring method using a CCD imaging device having a multiphase electrode structure having a plurality of electrodes from which photoelectrically converted charges are output in response to stored charge transfer pulses, said monitoring method comprising the steps of:

switching one or two or more of the plurality of electrodes to thereby produce a plurality of pictures;

allocating, based on addresses of pixel defects present on the CCD imaging device, the pixel defecs said plurality of pictures;

totalizing the pixel defects picture by picture to thereby determine one picture including a smallest number of pixel defects; and applying the stored charge transfer pulses to one or two or more of the plurality electrodes capable of producing said one picture to thereby output a vertically thinned picture to be monitored.

3. A method in accordance with claim 2, further comprising the step of weighting each of the pixel defects allocated to said plurality of pictures in a preselected manner before totalization.

4. A digital still camera comprising:

a CCD imaging device having a multiphase electrode structure having a plurality of electrodes from which photoelectrically converted charges are output in response to stored charge transfer pulses; and a set switch for switching one or two or more of the plurality of electrodes to thereby output a plurality of vertically thinned pictures which differ from each other in number of omitted lines, wherein the one or the two or more electrodes capable of producing one picture including a relatively smallest number of pixel defects among the plurality of vertically thinned pictures is selected in a monitor mode.

5. A digital still camera comprising:

a CCD imaging device having a multiphase electrode structure having a plurality of electrodes from which photoelectrically converted charges are output in response to stored charge transfer pulses;

a storing means for storing pixel defects present on said CCD imaging device in a form of addresses of said CCD imaging device beforehand; and a setting means for switching one or two or more of the plurality of electrodes to thereby produce a plurality of pictures, allocating the pixel defects to said plurality of pictures on the basis of the addresses of the pixel defects, totalizing the pixel defects picture by picture to thereby determine one picture including a smallest number of pixel defects, and applying the stored charge transfer pulses to one or two or more of the plurality electrodes capable of producing said one picture to thereby output a vertically thinned picture to be monitored.

6. A digital still camera comprising:

a CCD imaging device having a multiphase electrode structure having a plurality of electrodes from which photoelectrically converted charges are output in response to stored charge transfer pulses;

a storing means for storing pixel defects present on said CCD imaging device in a form of addresses of said CCD imaging device beforehand;

a setting means for switching one or two or more of the plurality of electrodes to thereby produce a plurality of pictures, allocating the pixel defects to said plurality of pictures on the basis of the addresses of the pixel defects, totalizing the pixel defects picture by picture to thereby determine one picture including a smallest number of pixel defects, and applying the stored charge transfer pulses to one or two or more of the plurality electrodes capable of producing said one picture to thereby output a vertically thinned picture to be monitored; and a control means for causing, when the addresses stored in said storing means are updated, said setting means to set the electrodes to which the stored charge transfer pulses should be applied at the time of monitoring.

7. A camera in accordance with claim 5, wherein said setting means weights each of the pixel defects allocated to said plurality of pictures in a preselected manner before totalization.

8. A camera in accordance with claim 6, wherein said setting means weights each of the pixel defects allocated to said plurality of pictures in a preselected manner before totalization.

* * * * *